US012768369B2

(12) United States Patent
Osmeda et al.

(10) Patent No.: US 12,768,369 B2
(45) Date of Patent: Oct. 20, 2026

(54) CLOG-RESISTANT JET PUMP FOR A FUEL SYSTEM

(71) Applicant: PHINIA Jersey Holdings LLC, Wilmington, DE (US)

(72) Inventors: Michal Osmeda, Slomniki (PL); Maciej Szymon Kaliciak, Stryszawa (PL)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 73 days.

(21) Appl. No.: 18/810,738

(22) Filed: Aug. 21, 2024

(65) Prior Publication Data

US 2026/0055783 A1 Feb. 26, 2026

(51) Int. Cl.

| | |
|---|---|
| ***F04F 5/44*** | (2006.01) |
| ***B60K 15/03*** | (2006.01) |
| ***F02M 37/02*** | (2006.01) |
| ***F02M 37/12*** | (2006.01) |
| ***F04F 5/02*** | (2006.01) |
| ***F04F 5/10*** | (2006.01) |
| ***F04F 5/46*** | (2006.01) |

(52) U.S. Cl.

CPC ............. *F04F 5/44* (2013.01); *F02M 37/025* (2013.01); *F02M 37/12* (2013.01); *F04F 5/02* (2013.01); *F04F 5/10* (2013.01); *F04F 5/466* (2013.01); *B60K 2015/0325* (2013.01)

(58) Field of Classification Search

CPC ........ F04F 5/02; F04F 5/10; F04F 5/44; F04F 5/466; F02M 37/025; F02M 37/12; B60K 2015/0325

USPC .......................................................... 417/51

See application file for complete search history.

(56) References Cited

U.S. PATENT DOCUMENTS

| | | | | |
|---|---|---|---|---|
| 6,405,717 | B1 * | 6/2002 | Beyer | F02M 37/025 123/514 |
| 2011/0146628 | A1 * | 6/2011 | Powell | F02M 37/0052 417/151 |
| 2014/0314591 | A1 | 10/2014 | Herrera et al. | |
| 2018/0283331 | A1 * | 10/2018 | Porras | F02M 37/025 |
| 2020/0003166 | A1 | 1/2020 | Porras et al. | |
| 2022/0090610 | A1 * | 3/2022 | Martin | F04F 5/10 |
| 2023/0146010 | A1 * | 5/2023 | Carter | F02M 37/025 417/151 |

* cited by examiner

*Primary Examiner* — Mark A Laurenzi
*Assistant Examiner* — Benjamin Doyle
(74) *Attorney, Agent, or Firm* — WARNER NORCROSS + JUDD LLP

(57) ABSTRACT

A jet pump is provided. The jet pump includes a body defining a fuel passage therein. The body includes an inlet and at least one exit orifice. The at least one exit orifice is downstream from the inlet in a direction of fuel flow from the inlet to the at least one exit orifice. A flow path is defined through the fuel passage from the inlet to the at least one exit orifice. A flow restrictor is disposed in the fuel passage between the inlet and the at least one exit orifice. The flow restrictor reduces dynamic pressure within the fuel passage and allows for increasing a cross-sectional area of the at least one exit orifice. A jet pump assembly including the jet pump and at least one fuel reservoir refill passage is also provided. A fuel system including the jet pump assembly and a fuel pump is further provided.

11 Claims, 6 Drawing Sheets

CLOG-RESISTANT JET PUMP FOR A FUEL SYSTEM

FIELD OF THE INVENTION

The disclosure generally relates to fuel systems and, more specifically, to a fuel system including a jet pump and particularly to such a jet pump.

BACKGROUND OF THE INVENTION

Fuel systems for internal combustion engines typically include a fuel tank for storing a volume of fuel that will be supplied to the internal combustion engine by a fuel pump. When such fuel systems are provided for a motor vehicle, the fuel system also commonly includes a fuel reservoir positioned within the fuel tank. The fuel reservoir provides a volume of fuel which is filled by fuel from the fuel tank. The fuel pump is positioned within the fuel reservoir in order to ensure an adequate supply of fuel is available to the fuel pump when the fuel tank is not full and dynamics of the motor vehicle may cause the fuel within the fuel tank to slosh or migrate to an area of the fuel tank away from the fuel reservoir. In order to maintain a sufficient level of fuel within the fuel reservoir, a jet pump, powered by pressurized fuel from the fuel pump, is used to aspirate fuel from the fuel tank into the fuel reservoir.

Known jet pumps include unobstructed internal passages and cavities having inlets and outlets that are limited by openings of various sizes. Thus, known jet pumps typically have only one orifice per outlet and free flow in the passage (s) within the body of the jet pump, whereby fluid pressure in an area around the orifice is the same or nearly the same as the pressure delivered by the fuel pump.

Jet pumps are vulnerable to clogging due to particulate matter (e.g., dust particles) or foreign fluids other than the fuel being transported through the passage(s) of the jet pump. To avoid clogging, the size/diameter of the exit orifice(s) of the jet pump can be made larger to avoid capturing of the particulate matter within the jet pump, especially in agricultural and/or heavy-duty applications. However, increasing the size of the exit orifice(s) of the jet pump results in energy waste due to the increased orifice size causing the flow through the jet pump to be too high which in turn requires an oversized (increased capacity) fuel pump to meet fuel delivery requirements.

Therefore, a need exists for a jet pump and fuel system including a jet pump that minimizes or eliminates one or more of these deficiencies.

BRIEF SUMMARY

An improved jet pump is provided. The jet pump includes a body that defines a fuel passage therein. The body includes an inlet and at least one exit orifice. The at least one exit orifice is downstream from the inlet in a direction of fuel flow from the inlet to the at least one exit orifice. A flow path is defined through the fuel passage from the inlet to the at least one exit orifice. A flow restrictor is disposed in the fuel passage between the inlet and the at least one exit orifice. The flow restrictor reduces dynamic pressure within the fuel passage and allows for increasing a cross-sectional area of the at least one exit orifice.

In specific embodiments, the flow restrictor is a preliminary orifice that is proximate the inlet of the body along the flow path.

In particular embodiments, the preliminary orifice is closer to the inlet along the flow path than the preliminary orifice is to the at least one exit orifice.

In specific embodiments, the flow restrictor is one or more vanes extending from an inner wall of the body into the fuel passage.

In particular embodiments, the flow restrictor includes a plurality of the vanes, and the plurality of vanes form a circuitous flow path portion in the fuel passage.

In certain embodiments, the vanes extend from opposite sides of an inner wall of the body in an alternating relationship.

In specific embodiments, the flow restrictor is a porous material filling a portion of the fuel passage.

In particular embodiments, the porous material is one of a fuel-resistant foam and a screen.

In particular embodiments, the porous material is proximate the inlet of the body along the flow path.

In certain embodiments, the porous material is closer to the inlet along the flow path than the porous material is to the at least one exit orifice.

In specific embodiments, the jet pump includes two of the exit orifices.

A jet pump assembly is also provided. The jet pump assembly includes at least one fuel reservoir refill passage and a jet pump. Each fuel reservoir refill passage is defined by a separate tube having a refill passage inlet and a refill passage outlet. The jet pump includes a body that defines a fuel passage therein. The body includes an inlet and at least one exit orifice. The at least one exit orifice is downstream from the inlet in a direction of fuel flow from the inlet to the at least one exit orifice. A flow path is defined through the fuel passage from the inlet to the at least one exit orifice. A flow restrictor is disposed in the fuel passage between the inlet and the at least one exit orifice. The flow restrictor reduces dynamic pressure within the fuel passage and allows for increasing a cross-sectional area of the at least one exit orifice. The inlet of the jet pump is configured to be connected to receive pressurized fuel from a fuel pump outlet of a fuel pump. Each exit orifice of the jet pump extends into a respective one of the at least one fuel reservoir refill passage. Each exit orifice is configured to discharge a first flow of fuel into the respective fuel reservoir refill passage and create a venturi effect within the respective fuel reservoir refill passage which draws a second flow of fuel into the respective fuel reservoir refill passage through the refill passage inlet such that the first flow of fuel and the second flow of fuel combine in the respective fuel reservoir refill passage and exit the respective fuel reservoir refill passage through the refill passage outlet.

In specific embodiments, the flow restrictor is one of: i) a preliminary orifice that is proximate the inlet of the body along the flow path; ii) one or more vanes extending from an inner wall of the body into the fuel passage; and iii) a porous material filling a portion of the fuel passage.

In particular embodiments, the flow restrictor is the preliminary orifice, and the preliminary orifice is closer to the inlet along the flow path than the preliminary orifice is to the at least one exit orifice.

In particular embodiments, the flow restrictor is a plurality of the vanes, and the vanes extend from opposite sides of an inner wall of the body in an alternating relationship and form a circuitous flow path portion in the fuel passage.

In particular embodiments, the flow restrictor is the porous material, and the porous material is one of a fuel-resistant foam and a screen.

A fuel system for supplying fuel to a fuel consuming device is also provided. The fuel system includes a fuel pump having a fuel pump inlet and a fuel pump outlet such that the fuel pump is configured to pump fuel from the fuel pump inlet to the fuel pump outlet. The fuel system further includes a jet pump assembly including at least one fuel reservoir refill passage and a jet pump. Each fuel reservoir refill passage is defined by a separate tube having a refill passage inlet and a refill passage outlet. The jet pump includes a body that defines a fuel passage therein. The body includes an inlet and at least one exit orifice. The at least one exit orifice is downstream from the inlet in a direction of fuel flow from the inlet to the at least one exit orifice. A flow path is defined through the fuel passage from the inlet to the at least one exit orifice. A flow restrictor is disposed in the fuel passage between the inlet and the at least one exit orifice. The flow restrictor reduces dynamic pressure within the fuel passage and allows for increasing a cross-sectional area of the at least one exit orifice. The inlet of the jet pump is configured to be connected to receive pressurized fuel from a fuel pump outlet of a fuel pump. The inlet of the jet pump is configured to be connected to receive pressurized fuel from the fuel pump outlet of the fuel pump. Each exit orifice of the jet pump extends into a respective one of the at least one fuel reservoir refill passage. Each exit orifice is configured to discharge a first flow of fuel into the respective fuel reservoir refill passage and create a venturi effect within the respective fuel reservoir refill passage which draws a second flow of fuel into the respective fuel reservoir refill passage through the refill passage inlet such that the first flow of fuel and the second flow of fuel combine in the respective fuel reservoir refill passage and exit the respective fuel reservoir refill passage through the refill passage outlet.

In specific embodiments, the flow restrictor is one of: i) a preliminary orifice that is proximate the inlet of the body along the flow path; ii) one or more vanes extending from an inner wall of the body into the fuel passage; and iii) a porous material filling a portion of the fuel passage.

In particular embodiments, the flow restrictor is the preliminary orifice, and the preliminary orifice is closer to the inlet along the flow path than the preliminary orifice is to the at least one exit orifice.

In particular embodiments, the flow restrictor is a plurality of the vanes, and the vanes extend from opposite sides of an inner wall of the body in an alternating relationship and form a circuitous flow path portion in the fuel passage.

In particular embodiments, the flow restrictor is the porous material, and the porous material is one of a fuel-resistant foam and a screen.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A jet pump, jet pump assembly including the jet pump, and a fuel system including the jet pump assembly are provided. Referring to FIGS. 1-6, wherein like numerals indicate corresponding parts throughout the several views, the fuel system is illustrated and generally designated as 10. The fuel system 10 is configured to supply fuel to a fuel consuming device, illustrated by way of non-limiting example only, as an internal combustion engine 12. The fuel of the fuel system 10 may be any liquid fuel customarily used, for example only, gasoline, diesel fuel, ethanol, other alcohol(s), blends thereof, and the like. The jet pump advantageously resists becoming clogged with particulate and/or foreign matter without unnecessary expenditure on parasitic flow from the fuel pump by inclusion of a flow restrictor as discussed herein. Certain features of the jet pump are functional, but can be implemented in different aesthetic configurations.

Figure 1:
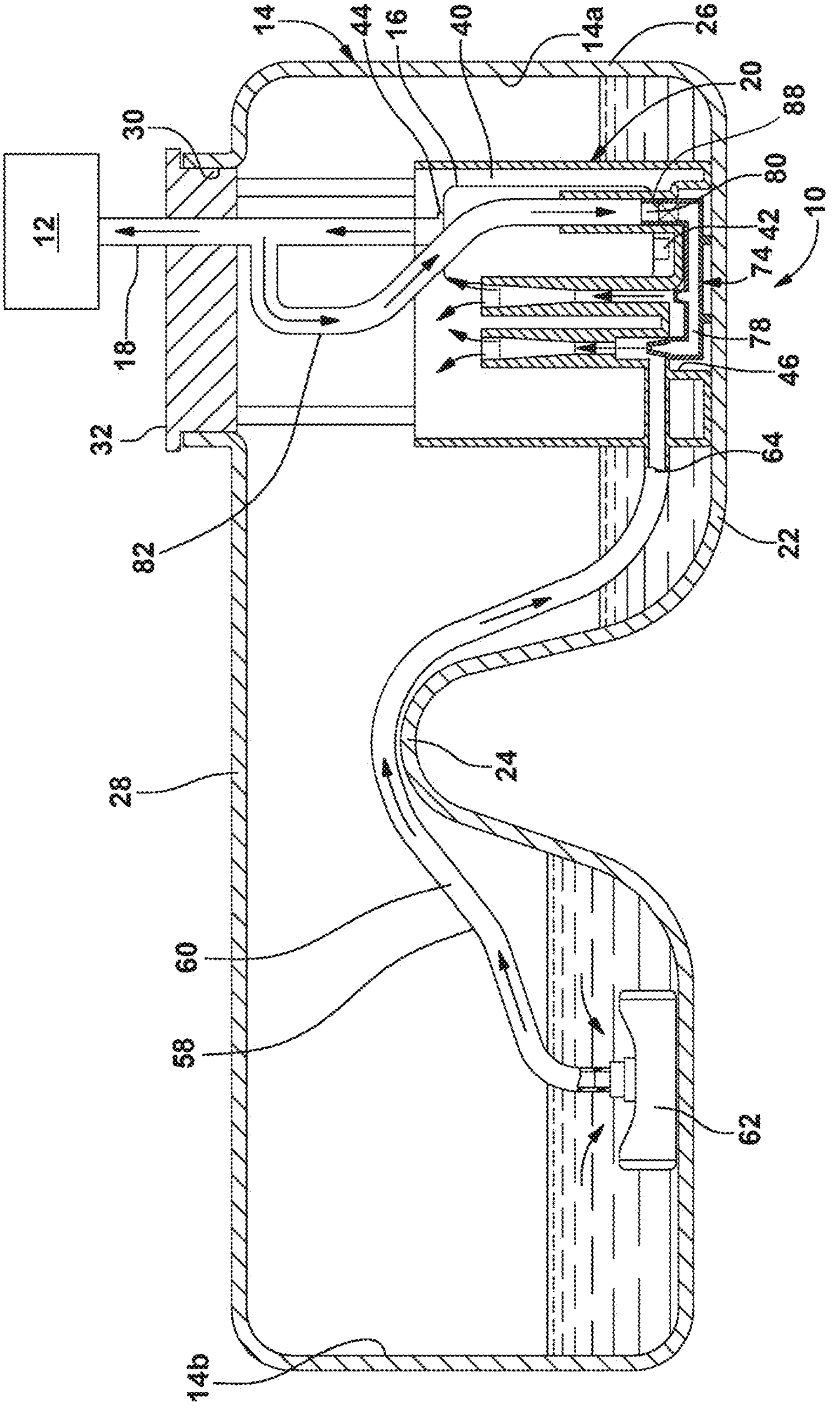
FIG. 1 is a schematic cross-sectional view of a fuel system in accordance with embodiments of the disclosure for supplying fuel to an internal combustion engine.
Figure 2:
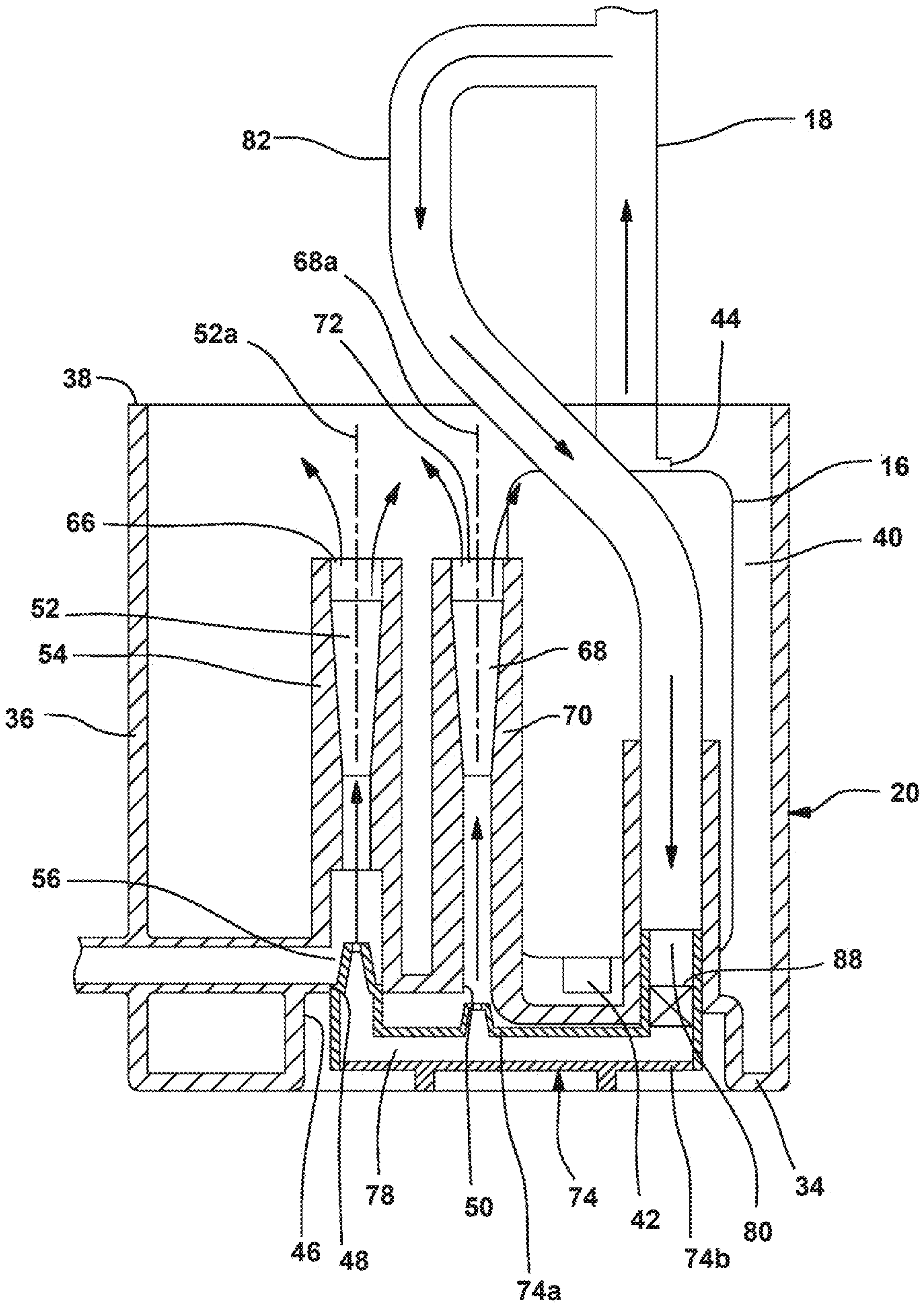
FIG. 2 is a cross-sectional view of a fuel reservoir and jet pump of the fuel system of FIG. 1.

With reference first to FIGS. 1 and 2, the fuel system 10 includes a fuel tank 14 for storing a quantity of fuel and a fuel pump 16 for pumping fuel from the fuel tank 14 to the internal combustion engine 12. Fuel that is pumped by the fuel pump 16 is communicated to the internal combustion engine 12 through a fuel supply line 18. The fuel pump 16 is an electric fuel pump which receives electricity from an electricity source (not shown), and may be, by way of non-limiting example only, a fuel pump as disclosed in U.S. Patent Application Publication No. 2014/0314591 A1, the entire disclosure of which is incorporated herein by reference in its entirety. The fuel pump 16 is disposed within a fuel reservoir 20, which is a separate container within the fuel tank 14 that is filled with fuel from the fuel tank 14. When the fuel level in the fuel tank 14 is sufficiently high, the fuel reservoir 20 is filled by fuel simply spilling over the top of the fuel reservoir 20. However, when the fuel level in the fuel tank 14 is not sufficiently high to spill over the top of the fuel reservoir 20, the fuel reservoir 20 is filled by the fuel pump 16 as will be described in greater detail below.

The fuel tank 14 has a fuel tank bottom wall 22 which defines a partition 24 extending upward near the center thereof which divides fuel tank 14 into a primary fuel tank portion **14*a* and a secondary fuel tank portion 14*b* such that the fuel pump 16 and the fuel reservoir 20 are located within primary fuel tank portion 14*a*. The fuel tank 14 also includes a fuel tank sidewall 26 around the periphery of the fuel tank bottom wall 22 which extends generally perpendicularly upward from the fuel tank bottom wall 22. The fuel tank 14 also includes a fuel tank top wall 28 which extends from the fuel tank sidewall 26 in a generally perpendicular direction such that the fuel tank top wall 28 opposes the fuel tank bottom wall 22. The fuel tank top wall 28 includes a fuel tank opening 30 therethrough which accommodates insertion of the fuel pump 16 and the fuel reservoir 20 thereinto such that the fuel tank opening 30 is closed by a fuel tank cover 32. The fuel tank 14** is made of a rigid material as is well-known to those of skill in the art of fuel tanks, and may be, by way of non-limiting example only, a plastic material manufactured by a blow molding process.

The fuel reservoir 20 includes a fuel reservoir bottom wall 34 and a fuel reservoir sidewall 36 which is generally annular in shape such that the fuel reservoir sidewall 36 extends from the fuel reservoir bottom wall 34 in a generally perpendicular direction from the fuel reservoir bottom wall 34 to a top end 38 thereof which is open and which defines an overflow level of the fuel reservoir 20. The fuel reservoir 20 is thus bucket-shaped and defines a fuel reservoir volume 40 therewithin such that the fuel pump 16 is disposed within the fuel reservoir volume 40. Fuel is drawn into the fuel pump 16 through a fuel pump inlet 42 of the fuel pump 16 from the fuel reservoir volume 40 and pumps the fuel to the fuel supply line 18 through a fuel pump outlet 44 of the fuel pump 16. The fuel reservoir bottom wall 34 includes a fuel reservoir recess 46 which faces toward the fuel tank bottom wall 22 such that a first opening 48 through the fuel reservoir bottom wall 34 passes into the fuel reservoir recess 46 and such that a second opening 50 through the fuel reservoir bottom wall 34 passes into the fuel reservoir recess 46.

A first fuel reservoir refill passage 52 defined by a first fuel reservoir refill tube 54 is located within the fuel reservoir volume 40 such that the first opening 48 opens into the first fuel reservoir refill passage 52 and such that first fuel reservoir refill passage 52 is centered about, and extends along, a first fuel reservoir refill passage axis 52*a*. As shown, the first fuel reservoir refill tube 54 may be molded as a single piece of plastic with the fuel reservoir 20, but alternatively may be formed separately and subsequently fixed to the fuel reservoir 20. The first fuel reservoir refill passage 52 includes a first fuel reservoir refill passage inlet 56. A transfer tube 58 defines a transfer fuel passage 60 having a transfer fuel passage inlet 62, depicted in FIG. 1 as a strainer, located within the secondary fuel tank portion 14*b* and also having a transfer fuel passage outlet 64 which is connected to the first fuel reservoir refill passage inlet 56. The first fuel reservoir refill passage 52 includes a first fuel reservoir refill passage outlet 66 which opens into the fuel reservoir volume 40. The first fuel reservoir refill passage 52 is used to refill the fuel reservoir volume 40 with fuel from the secondary fuel tank portion 14*b* as will be described in greater detail below.

A second fuel reservoir refill passage 68 defined by a second fuel reservoir refill tube 70 is located within the fuel reservoir volume 40 such that the second opening 50 opens into the second fuel reservoir refill passage 68 and such that the second fuel reservoir refill passage 68 is centered about, and extends along, a second fuel reservoir refill passage axis 68*a*. As shown, the second fuel reservoir refill tube 70 may be molded as a single piece of plastic with the fuel reservoir 20, but alternatively may be formed separately and subsequently fixed to the fuel reservoir 20. The second fuel reservoir refill passage 68 is open to the fuel reservoir recess 46 through the second opening 50, and in this way, the second opening 50 serves as an inlet to the second fuel reservoir refill passage 68. The second fuel reservoir refill passage 68 includes a second fuel reservoir refill passage outlet 72 which opens into the fuel reservoir volume 40. The second fuel reservoir refill passage 68 is used to refill the fuel reservoir volume 40 with fuel from the primary fuel tank portion 14*a* as will be described in greater detail below.

Figure 3:
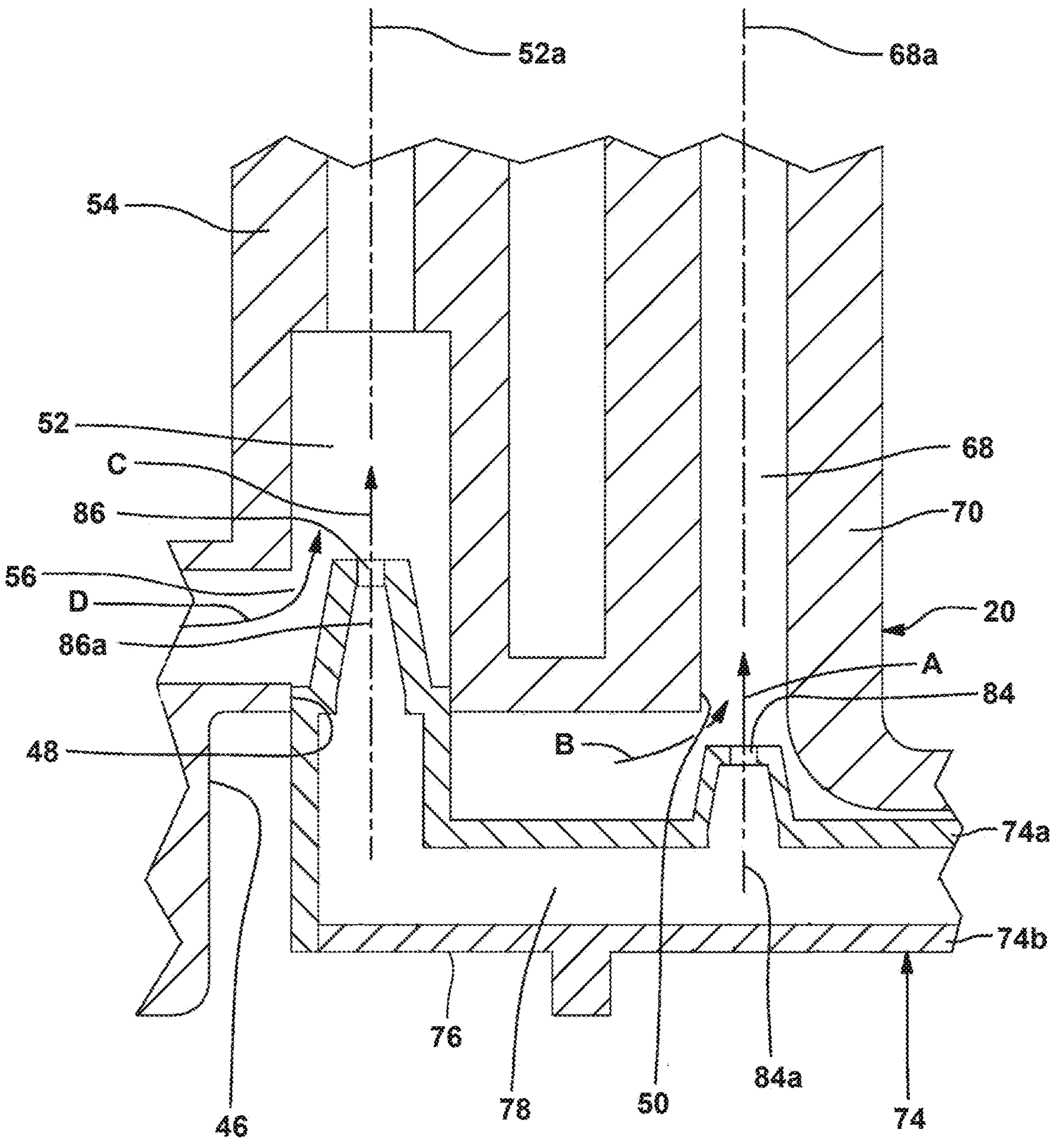
FIG. 3 is an enlarged portion of FIG. 2.

With continued reference to FIGS. 1-2 and further reference now to FIG. 3, in order to refill the fuel reservoir volume 40 with fuel from the primary fuel tank portion 14*a* and the secondary fuel tank portion 14*b*, a jet pump 74 is provided. The jet pump 74, shown only schematically in FIGS. 1-3, is formed of a generally tubular or tubular-like body 76 that defines a jet pump fuel passage 78 therein. As shown, the jet pump 74 may comprise a jet pump upper portion 74*a* and a jet pump lower portion 74*b* which are sealingly joined together to define the jet pump fuel passage 78. The two-piece construction allows for manufacturing of the jet pump 74 using conventional injection molding processes. The jet pump 74 includes a jet pump inlet 80 which is connected to the fuel pump outlet 44 such that the jet pump fuel passage 78 receives pressurized fuel from the fuel pump outlet 44 through a jet pump supply line 82. As shown, the jet pump supply line 82 branches off from the fuel supply line 18, but alternatively may receive fuel from the fuel pump 16 through a dedicated outlet or may receive fuel from the fuel pump 16 through a fuel return line from the internal combustion engine 12 which communicates unused fuel back to the fuel tank 14. The jet pump 74, together with the first fuel reservoir refill passage 52 and the second fuel reservoir refill passage 68, define a jet pump assembly. While the jet pump 74 has been illustrated herein as being formed as a separate component from the first fuel reservoir refill passage 52 and the second fuel reservoir refill passage 68, it should be understood that the jet pump 74 alternatively may be integrally formed as a single piece with one or more of the first fuel reservoir refill passage 52 and the second fuel reservoir refill passage 68 such that the jet pump 74 is still identifiable as a tube distinct from the tubes which form the first fuel reservoir refill passage 52 and the second fuel reservoir refill passage 68.

The jet pump 74 includes a jet pump first fuel tank portion exit orifice 84 which extends therethrough the upper portion 74*a* of the wall of the jet pump 74, to define a first outlet of the jet pump fuel passage 78. The jet pump first fuel tank portion exit orifice 84 is centered about, and extends along, a jet pump first fuel tank portion exit orifice axis 84*a* such that the jet pump first fuel tank portion exit orifice axis 82*a* is coincident with the second fuel reservoir refill passage axis 68*a*. The jet pump first fuel tank portion exit orifice 84 is directed into the second fuel reservoir refill passage 68, and consequently, fuel (indicated by fuel flow arrow A in FIG. 3) that exits the jet pump 74 through the jet pump first fuel tank portion exit orifice 84 creates a venturi effect within the second fuel reservoir refill passage 68 which draws fuel (indicated by fuel flow arrow B in FIG. 3) into the second fuel reservoir refill passage 68 through the second opening 50. The fuel drawn into the second fuel reservoir refill passage 68 through the second opening 50 combines with the fuel directed into the second fuel reservoir refill passage 68 from the jet pump first fuel tank portion exit orifice 84 and exits the second fuel reservoir refill passage 68 through the second fuel reservoir refill passage outlet 72 to refill the fuel reservoir volume 40. The jet pump first fuel tank portion exit orifice 84 is thus downstream from the jet pump inlet 80 in the direction of fuel flow from the jet pump inlet 80 to the jet pump first fuel tank portion exit orifice 84, and a fuel flow path is defined through the fuel passage 78 from the jet pump inlet 80 to the jet pump first fuel tank portion exit orifice 84.

A portion of the jet pump 74 extends into the first opening 48 of the fuel reservoir bottom wall 34 and includes a jet pump second fuel tank portion exit orifice 86 which extends therethrough the upper portion 74*a* of the wall of the jet pump 74, to define another (second) outlet. The portion of the jet pump 74 which extends into the first opening 48 fits tightly with the first opening 48 so as to prevent fuel from passing between the interface of the first opening 48 and the jet pump 74. The jet pump second fuel tank portion exit orifice 86 is centered about, and extends along, a jet pump second fuel tank portion exit orifice axis 86*a* such that the jet pump second fuel tank portion exit orifice axis 88*a* extends in the same direction as the first fuel reservoir refill passage axis 52*a*, and preferably is coincident with the first fuel reservoir refill passage axis 52*a*, so that the first fuel reservoir refill passage 52 and the jet pump second fuel tank portion exit orifice 86 share the same axis. The jet pump second fuel tank portion exit orifice axis 86*a*, and consequently the jet pump second fuel tank portion exit orifice 86, is directed into the first fuel reservoir refill passage 52, and consequently, fuel (indicated by fuel flow arrow C in FIG. 3) that exits the jet pump 74 through the jet pump second fuel tank portion exit orifice 86 creates a venturi effect within the first fuel reservoir refill passage 52 which draws fuel (indicated by fuel flow arrow D in FIG. 3) into the first fuel reservoir refill passage 52 through first fuel reservoir refill passage inlet 56 from the secondary fuel tank portion 14*b* via transfer tube 58. The fuel drawn into the first fuel reservoir refill passage 52 through the first fuel reservoir refill passage inlet 56 combines with the fuel directed into the first fuel reservoir refill passage 52 from the jet pump second fuel tank portion exit orifice 86 and exits the first fuel reservoir refill passage 52 through the first fuel reservoir refill passage outlet 66 to refill the fuel reservoir volume 40. The jet pump second fuel tank portion exit orifice 86 is thus downstream from the jet pump inlet 80 in the direction of fuel flow from the jet pump inlet 80 to the jet pump second fuel tank portion exit orifice 86, and a fuel flow path is defined through the fuel passage 78 from the jet pump inlet 80 to the jet pump second fuel tank portion exit orifice 86. The jet pump second fuel tank portion exit orifice 86 is also downstream from the jet pump first fuel tank portion exit orifice 84, and as such, a portion of the flow path between the jet pump inlet 80 and the jet pump first fuel tank portion exit orifice 84 is coincident with the flow path between the jet pump inlet 80 and the jet pump second fuel tank portion exit orifice 86.

Figure 4:
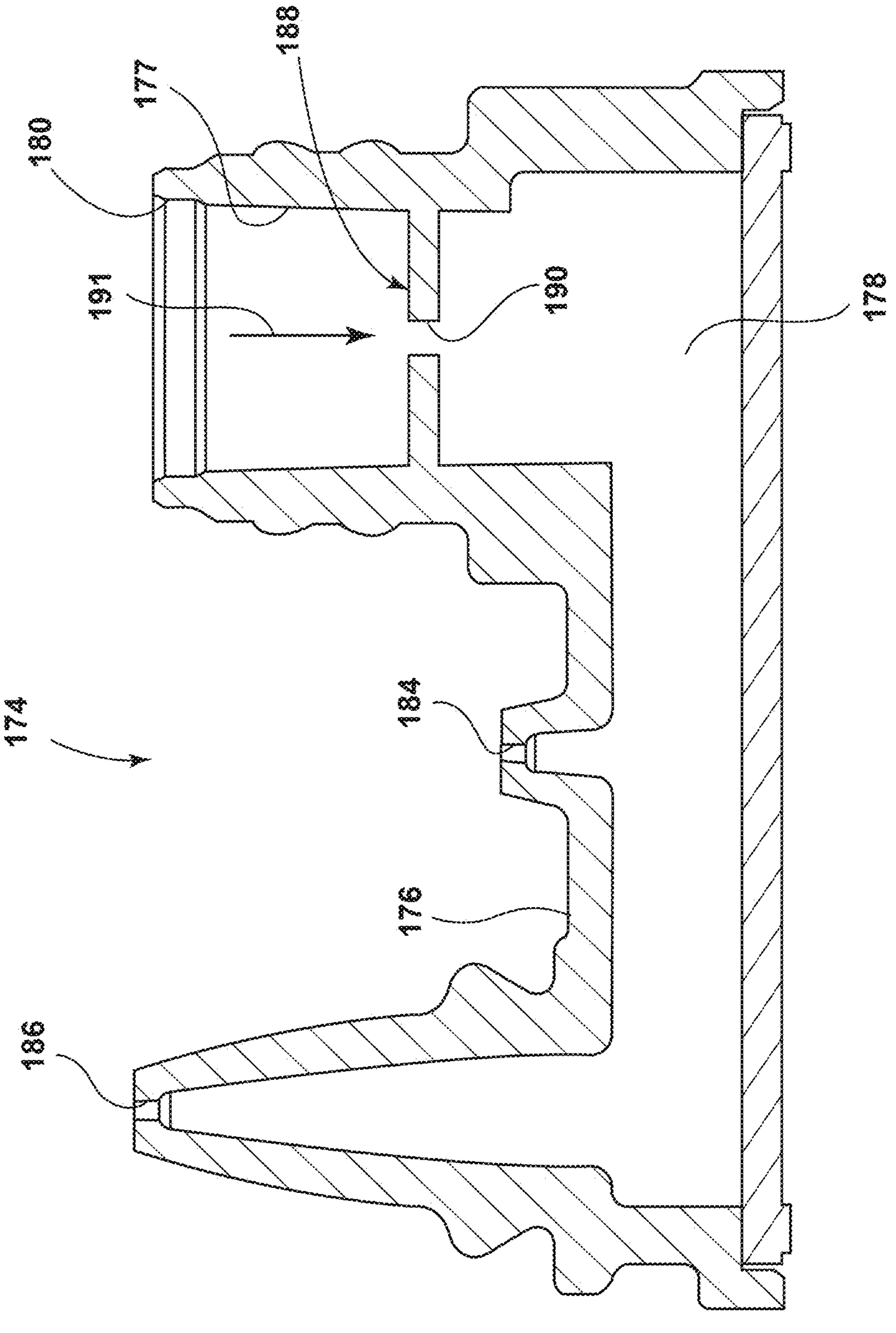
FIG. 4 is a cross-sectional view of a jet pump in accordance with some embodiments of the disclosure.
Figure 5:
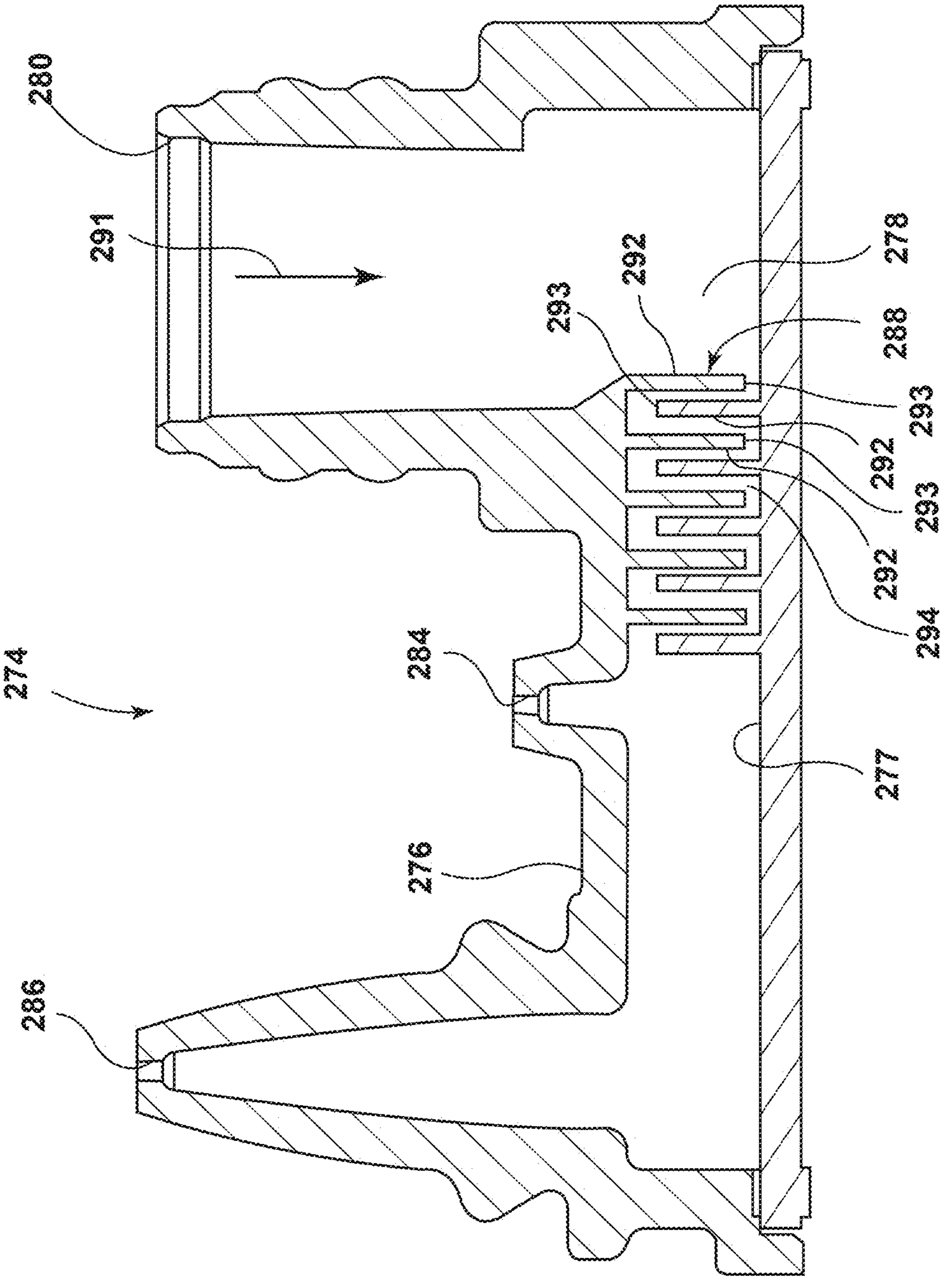
FIG. 5 is a cross-sectional view of a jet pump in accordance with other embodiments of the disclosure.
Figure 6:
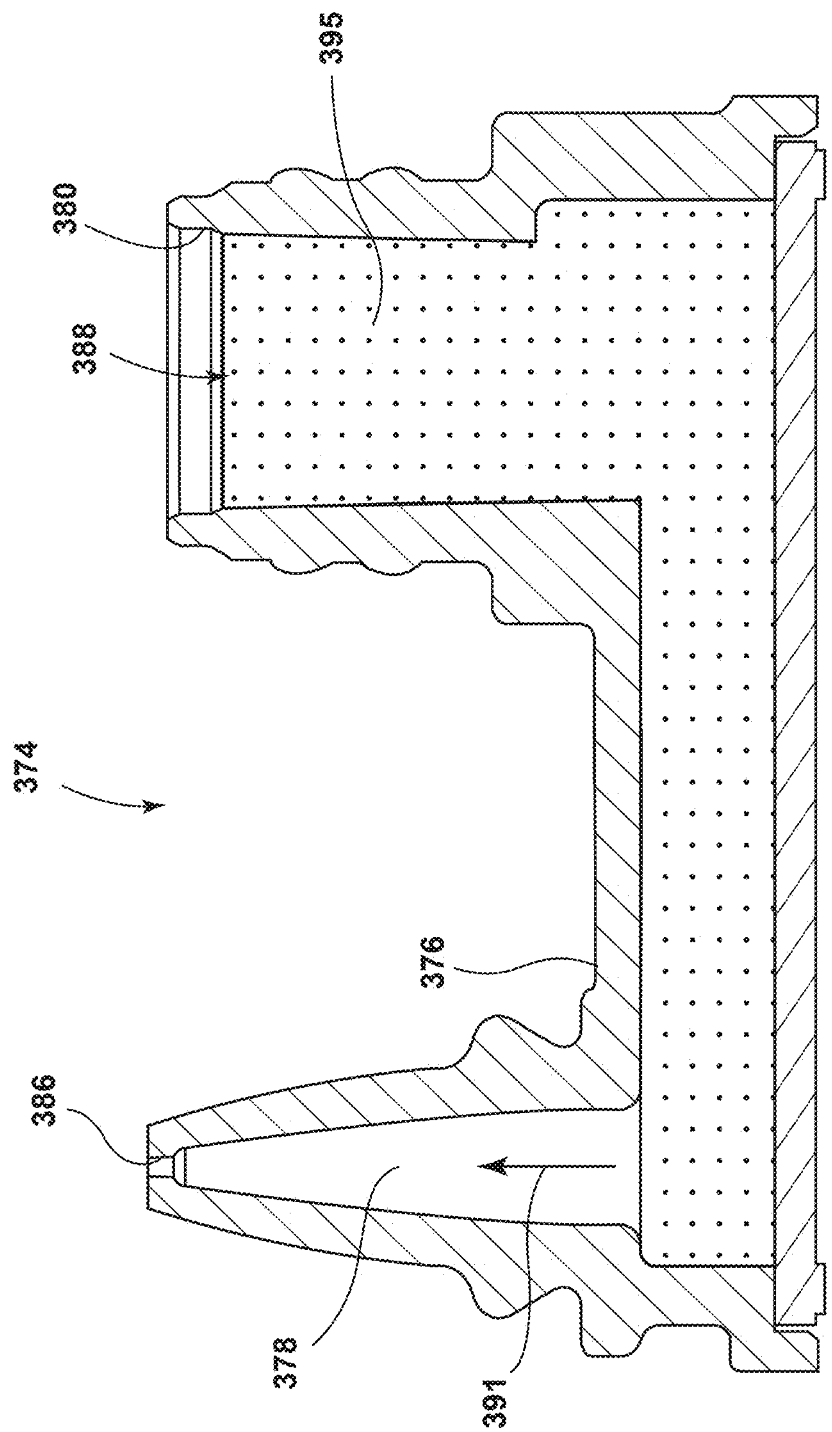
FIG. 6 is a cross-sectional view of a jet pump in accordance with yet other embodiments of the disclosure.

Turning additionally now to FIGS. 4-6, further aspects of the jet pump in accordance with the present embodiments are shown in greater detail. More particularly, the jet pump 74 includes a flow restrictor 88 (shown schematically in FIGS. 1 and 2) disposed in the fuel passage between the jet pump inlet 80 and the exit orifices 84, 86. The flow restrictor reduces dynamic pressure within the fuel passage and allows for increasing a cross-sectional area of the exit orifices. With reference to FIG. 4, in some embodiments the jet pump 174 includes a flow restrictor 188 within the body 176 disposed between the jet pump inlet 180 and the jet pump first fuel tank portion exit orifice 184. The flow restrictor 188 is also upstream along the fuel flow path 191 in relation to the jet pump first fuel tank portion exit orifice 184 and the jet pump second fuel tank portion exit orifice 186. The flow restrictor 188 is a preliminary orifice 190 that is proximate the jet pump inlet 180 along the fuel flow path 191 within the fuel passage 178. As such, the preliminary orifice 190 is closer to the jet pump inlet 180 along the fuel flow path 191 than the preliminary orifice 190 is to the jet pump first fuel tank portion exit orifice 184. The preliminary orifice 190 as shown is generally centered in relation to the jet pump inlet 180 and the fuel flow path 191, but alternatively the preliminary orifice 190 may be offset from an axis of the fuel passage 178 that is coincident with an axis of the jet pump inlet 180. The size of the preliminary orifice 190 is not particularly limited and may be varied to obtain the desired amount of flow restriction. In certain embodiments, the preliminary orifice 190 is larger in diameter than the jet pump first fuel tank portion exit orifice 184 and/or the jet pump second fuel tank portion exit orifice 186. The preliminary orifice 190 is defined by an opening in a plate or similar structure that extends inwardly from the inner wall of the body 176, and the flow restrictor 188 formed by this plate or similar structure is preferably integrally molded with the body 176. The flow restrictor 188 thereby does not require any additional parts, assembly tools, or assembly steps to be included in the jet pump 174. The preliminary orifice 190 obstructs flow within the fuel passage 178 and reduces the pressure in an area adjacent to the jet pump first fuel tank portion exit orifice 184 and the jet pump second fuel tank portion exit orifice 186 to allow for the size of the jet pump first fuel tank portion exit orifice 184 and the jet pump second fuel tank portion exit orifice 186 to be increased relative to the conventional size of these orifices. In turn, the flow restrictor 188 reduces or prevents particles from clogging the jet pump first fuel tank portion exit orifice 184 and the jet pump second fuel tank portion exit orifice 186.

With reference to FIG. 5, in other embodiments the jet pump 274 includes a flow restrictor 288 within the body 276 disposed between the jet pump inlet 280 and the jet pump first fuel tank portion exit orifice 284. The flow restrictor 288 is also upstream along the fuel flow path 291 in relation to the jet pump first fuel tank portion exit orifice 284 and the jet pump second fuel tank portion exit orifice 286. The flow restrictor 288 is formed of one or more, preferably a plurality, of stationary vanes 292 that extend inwardly from the inner wall 277 of the body 276 and into the fuel passage 278 in a cantilevered disposition. Each vane 292 has a free, terminal end 293 that is spaced a distance from the inner wall 277 opposite from the root of the vane 292 that is connected to the inner wall 277. Fluid (fuel) may only flow past the vane 292 in the area between the terminal end 293 and the inner wall 277. When the flow restrictor 288 is formed of a plurality of vanes 292, adjacent vanes 292 extend from opposite sides of the inner wall 277 in an alternating relationship, and the plurality of vanes 292 thereby form a circuitous, labyrinth-like flow path portion 294 along the fuel flow path 291 in the fuel passage 278. The vanes 292 are preferably integrally molded with the body 276. The flow restrictor 288 thereby does not require any additional parts, assembly tools, or assembly steps to be included in the jet pump 274. The vanes 292 of the flow restrictor 288 obstruct flow within the fuel passage 278 and reduce the pressure in an area adjacent to the jet pump first fuel tank portion exit orifice 284 and the jet pump second fuel tank portion exit orifice 286 to allow for the size of the jet pump first fuel tank portion exit orifice 284 and the jet pump second fuel tank portion exit orifice 286 to be increased relative to the conventional size of these orifices. In turn, the flow restrictor 288 reduces or prevents particles from clogging the jet pump first fuel tank portion exit orifice 284 and the jet pump second fuel tank portion exit orifice 286.

With reference to FIG. 6, in yet other embodiments the jet pump 374 includes a flow restrictor 388 within the body 376 disposed between the jet pump inlet 380 and the jet pump second fuel tank portion exit orifice 386. The flow restrictor 388 is also upstream along the fuel flow path 391 in relation to the jet pump second fuel tank portion exit orifice 386. It is noted that in these embodiments of the jet pump 374, the jet pump does not include a jet pump first fuel tank portion exit orifice, but if one were present, the flow restrictor 388 would also be upstream along the fuel flow path 391 from the jet pump first fuel tank portion exit orifice. The flow restrictor 388 is formed of a porous material 395 that fills a portion of the fuel passage 378. The porous material 395 is not particularly limited and may be any porous material that restricts flow. In certain embodiments, the porous material 395 is either a fuel-resistant foam, or a screen or other mesh-like material. While the porous material 395 is illustrated as filling a large portion of the fuel passage 378, the porous material 395 may fill a much smaller portion of the fuel passage 378 and may be disposed in an area that is only proximate the jet pump inlet 380. In any event, the porous material 395 is closer to the jet pump inlet 380 along the flow path 391 than the porous material 395 is to the jet pump second fuel tank portion exit orifice 386. The porous material may be inserted into the body 376, or in some instances may be integrally molded with the body. The porous material 395 of the flow restrictor 388 obstructs flow within the fuel passage 378 and reduces the pressure in an area adjacent to the jet pump second fuel tank portion exit orifice 386 to allow for the size of the jet pump second fuel tank portion exit orifice 386 to be increased relative to the conventional size of this orifice. In turn, the flow restrictor 388 reduces or prevents particles from clogging the jet pump second fuel tank portion exit orifice 386.

While each of the embodiments of the jet pump 174, 274, 374 have been described separately, the features of each embodiment are not mutually exclusive. Therefore, any of the various features of these embodiments of the jet pump 174, 274, 374 may be combined together. For example, a jet pump in accordance with the disclosure may include two or more of the structures of the flow restrictors 188, 288, 388. In one such example, the jet pump may include a flow restrictor including both a preliminary orifice and a plurality of vanes forming a circuitous path. In another such example, the jet pump may include a flow restrictor including both a preliminary orifice and a porous material. Further, the jet pump may include either one or two exit orifices in combination with one, two, or three of the structures of the flow restrictors 188, 288, 388.

While the embodiments above have been described in relation to a fuel system 10 in which the fuel reservoir 20 is filled by fuel from both the primary fuel tank portion 14*a* and the secondary fuel tank portion 14*b*, it should be understood that the disclosure is also applicable to fuel systems in which the fuel reservoir 20 is filled from a single area rather than two separate portions. In these embodiments, the jet pump may include only a single exit orifice outlet. An example of such embodiments is the jet pump 374 shown in FIG. 6.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

What is claimed is:

1. A jet pump comprising:

a body that defines a fuel passage therein, the body including an inlet and at least one exit orifice, the at least one exit orifice being downstream from the inlet in a direction of fuel flow from the inlet to the at least one exit orifice, and a flow path is defined through the fuel passage from the inlet to the at least one exit orifice; and a flow restrictor disposed in the fuel passage between the inlet and the at least one exit orifice, wherein the flow restrictor is a preliminary orifice that is proximate the inlet of the body along the flow path, the preliminary orifice is closer to the inlet along the flow path than the preliminary orifice is to the at least one exit orifice, and the preliminary orifice is larger in diameter than each of the at least one exit orifice of the jet pump.

2. The jet pump of claim 1, wherein the flow restrictor is one or more vanes extending from an inner wall of the body into the fuel passage.

3. The jet pump of claim 2, wherein the flow restrictor includes a plurality of said vanes, the plurality of vanes forming a circuitous flow path portion in the fuel passage.

4. The jet pump of claim 3, wherein the vanes extend from opposite sides of an inner wall of the body in an alternating relationship.

5. The jet pump of claim 1, wherein the flow restrictor is a porous material filling a portion of the fuel passage.

6. The jet pump of claim 5, wherein the porous material is one of a fuel-resistant foam and a screen.

7. The jet pump of claim 5, wherein the porous material is proximate the inlet of the body along the flow path.

8. The jet pump of claim 7, the porous material is closer to the inlet along the flow path than the porous material is to the at least one exit orifice.

9. The jet pump of claim 1, including two said exit orifices.

10. A jet pump assembly comprising:

at least one fuel reservoir refill passage, each fuel reservoir refill passage being defined by a separate tube having a refill passage inlet and a refill passage outlet; and a jet pump comprising:

a body that defines a fuel passage therein, the body including an inlet and at least one exit orifice, the at least one exit orifice being downstream from the inlet in a direction of fuel flow from the inlet to the at least one exit orifice, and a flow path is defined through the fuel passage from the inlet to the at least one exit orifice; and a flow restrictor disposed in the fuel passage between the inlet and the at least one exit orifice, wherein the flow restrictor is a preliminary orifice that is proximate the inlet of the body along the flow path, the preliminary orifice is closer to the inlet along the flow path than the preliminary orifice is to the at least one exit orifice, and the preliminary orifice is larger in diameter than each of the at least one exit orifice of the jet pump;

the inlet of the jet pump being configured to be connected to receive pressurized fuel from a fuel pump outlet of a fuel pump;

each exit orifice of the jet pump extending into a respective one of the at least one fuel reservoir refill passage;

wherein each exit orifice is configured to discharge a first flow of fuel into the respective fuel reservoir refill passage and create a venturi effect within the respective fuel reservoir refill passage which draws a second flow of fuel into the respective fuel reservoir refill passage through the refill passage inlet such that the first flow of fuel and the second flow of fuel combine in the respective fuel reservoir refill passage and exit the respective fuel reservoir refill passage through the refill passage outlet.

11. A fuel system for supplying fuel to a fuel consuming device, the fuel system comprising:

a fuel pump having a fuel pump inlet and a fuel pump outlet such that the fuel pump is configured to pump fuel from the fuel pump inlet to the fuel pump outlet; and a jet pump assembly comprising:

at least one fuel reservoir refill passage, each fuel reservoir refill passage being defined by a separate tube having a refill passage inlet and a refill passage outlet; and a jet pump comprising:

a body that defines a fuel passage therein, the body including an inlet and at least one exit orifice, the at least one exit orifice being downstream from the inlet in a direction of fuel flow from the inlet to the at least one exit orifice, and a flow path is defined through the fuel passage from the inlet to the at least one exit orifice; and a flow restrictor disposed in the fuel passage between the inlet and the at least one exit orifice, wherein the flow restrictor is a preliminary orifice that is proximate the inlet of the body along the flow path, the preliminary orifice is closer to the inlet along the flow path than the preliminary orifice is to the at least one exit orifice, and the preliminary orifice is larger in diameter than each of the at least one exit orifice of the jet pump;

the inlet of the jet pump being configured to be connected to receive pressurized fuel from the fuel pump outlet of the fuel pump;

each exit orifice of the jet pump extending into a respective one of the at least one fuel reservoir refill passage;

wherein each exit orifice is configured to discharge a first flow of fuel into the respective fuel reservoir refill passage and create a venturi effect within the respective fuel reservoir refill passage which draws a second flow of fuel into the respective fuel reservoir refill passage through the refill passage inlet such that the first flow of fuel and the second flow of fuel combine in the respective fuel reservoir refill passage and exit the respective fuel reservoir refill passage through the refill passage outlet.

* * * * *